United States Patent

Peters

Patent Number: 5,806,840
Date of Patent: Sep. 15, 1998

[54] FLUID-FILLED UNIT OF A CYLINDER AND A PISTON ROD, IN PARTICULAR GAS SPRING

[75] Inventor: Michael Peters, Korntal, Germany

[73] Assignee: SUSPA COMPART Aktiengesellschaft, Altdorf, Germany

[21] Appl. No.: 736,591

[22] Filed: Oct. 24, 1996

[30] Foreign Application Priority Data

Oct. 25, 1995 [DE] Germany .................. 195 39 616.2

[51] Int. Cl.$^6$ .................................................. F16F 9/342
[52] U.S. Cl. ................................ 267/64.15; 188/322.18
[58] Field of Search .............................. 92/170.1, 172, 92/194, 246; 267/124, 127, 129, 64.11, 64.15, 64.19, 64.27; 188/311, 313, 316, 317, 322.18, 322.22, 322.15, 281, 282

[56] References Cited

U.S. PATENT DOCUMENTS

| | | |
|---|---|---|
| 1,163,710 | 12/1915 | Trumble . |
| 2,992,052 | 7/1961 | De John . |
| 4,938,324 | 7/1990 | Van Dyke .................. 188/317 |
| 5,070,971 | 12/1991 | Dourson ..................... 188/317 |
| 5,170,866 | 12/1992 | Ghaem ........................ 188/317 |

FOREIGN PATENT DOCUMENTS

| | | |
|---|---|---|
| 719 682 | 4/1952 | Germany . |
| 879 038 | 6/1953 | Germany . |
| 17 03 936 | 2/1972 | Germany . |
| 77 21 901 | 4/1979 | Germany . |
| 40 39 845 | 7/1991 | Germany . |
| 278201 | 11/1926 | United Kingdom . |
| 707013 | 4/1954 | United Kingdom . |

*Primary Examiner*—Robert J. Oberleitner
*Assistant Examiner*—C. T. Bartz
*Attorney, Agent, or Firm*—Browdy and Neimark

[57] ABSTRACT

A gas spring having a cylinder and a piston rod. A piston mounted on a piston rod is provided with flexible tongue, rounded ends of which elastically bear on the inside wall of the housing while the rest of the piston is free from the housing. The flexible tongues assist in preventing partial cylindrical faces of the piston from smashing against the inside wall of the piston housing when the gas spring is vibrating.

7 Claims, 1 Drawing Sheet

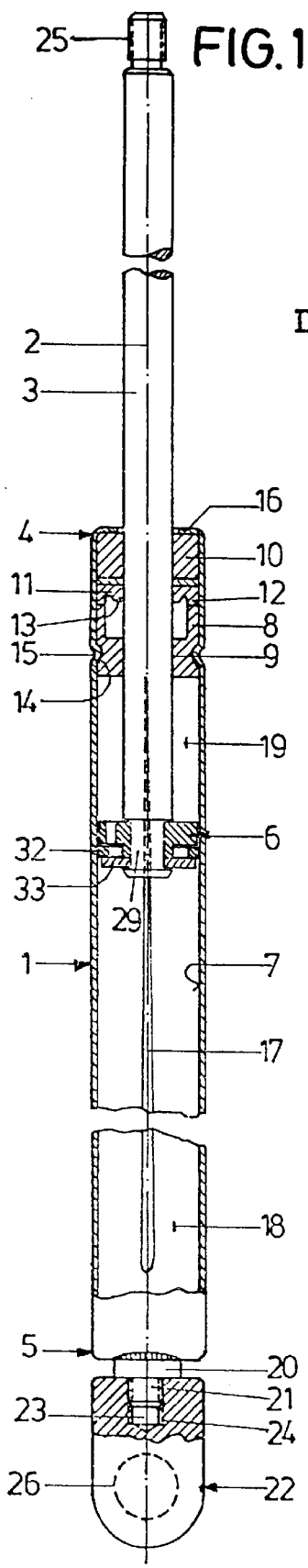
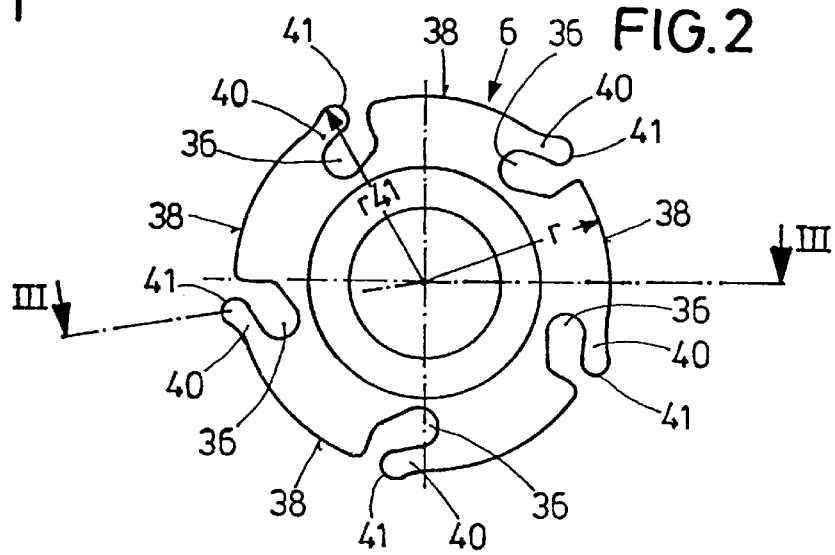
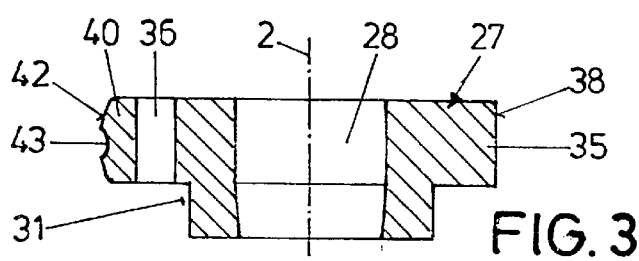
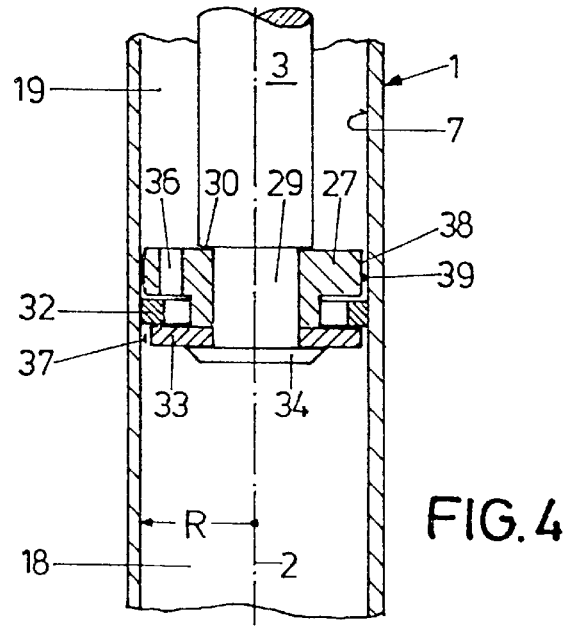

FLUID-FILLED UNIT OF A CYLINDER AND A PISTON ROD, IN PARTICULAR GAS SPRING

BACKGROUND OF THE INVENTION

1. Field Of The Invention

The invention relates to a fluid-filled unit of a cylinder and a piston rod, in particular a gas spring, comprising a substantially cylindrical housing, which has a central longitudinal axis, a closed first end, and a second end, and an inside wall; a piston rod, which is disposed partially inside the housing and partially outside the housing coaxially to the central longitudinal axis; a guide disposed on the second end of the housing for the guidance and sealing of the piston rod in the direction of the central longitudinal axis; and a piston, which is mounted on the piston rod and allocated to the inside wall.

2. Background Art

Gas springs are generally known. They comprise a substantially cylindrical housing, on which a piston rod is disposed concentrically, which is sealingly guided out of one end of the housing. A piston is mounted on the inner end of the piston rod and guided on the inside wall of the housing. It is a damping piston as a rule. In order for the friction between the piston and the inside wall of the housing to be kept as low as possible, some minor play is regularly provided between the piston and the inside wall of the housing. If the gas spring is upright in the mounted condition, there is the risk of noise. In particular, when retracted into the housing, the piston rod comprising the piston may be excited by vibrations of the vehicle in which it is installed, the piston rattling when smashed against the inside wall of the housing.

To avoid this problem, DE 40 39 845 A1 teaches that the piston ring, which alone rests on the inside wall of the housing, is supported by way of projections relative to the basic body of the piston, which is entirely the inside wall of the housing, any contact of the piston and the inside wall of the housing thus being avoided. Producing the piston ring is very complicated; moreover exacting tolerances have to be observed, which makes the manufacture of the piston rather costly.

SUMMARY OF THE INVENTION

It is the object of the invention to embody a unit of a cylinder and a piston rod in such a way that the requirements to avoid rattling are very low.

According to the invention, this object is attained by the the piston having partial faces, which are distributed over its circumference and leave open a gap towards the inside wall of the housing, and flexible tongues, which flexibly rest on the inside wall of the housing. The gist of the invention resides in that the piston is produced in one piece, in particular by injection-moulding from a plastic material, several flexible tongues being formed on the basic body of the piston. These flexible tongues keep the piston off the inside wall of the housing. The springiness of the flexible tongues can be influenced by the thickness of their connection to the basic body of the piston.

Further features, advantages and details will become apparent from the ensuing description of an exemplary embodiment, taken in conjunction with the drawing.

BRIEF DESCRIPTION OF THE DRAWING

FIG. 1 is a longitudinal section of a gas spring,

FIG. 2 is a plan view of the basic body of the piston of the gas spring,

FIG. 3 is a longitudinal section through the basic body of the piston on the section line III—III of FIG. 2, and FIG. 4 is a partial illustration on an enlarged scale of the piston in the housing.

DESCRIPTION OF THE PREFERRED EMBODIMENT

The gas spring of the drawing comprises a housing 1 substantially consisting of a cylindrical tube with a central longitudinal axis 2 and a piston rod 3 coaxial with the axis 2 and displaceable in the housing 1. The piston rod 3 is extended out of the end 4 of the housing 1. The other end 5 of the housing 1 is closed gas-tight.

The end of the piston rod 3 located in the housing 1 is provided with a piston 6 which is guided on the inside wall 7 of the housing 1. The piston 6 is a so-called damping piston exhibiting different damping characteristics for the insertion of the piston rod 3 into the housing 1 and for the extraction of the piston rod 3 out of the housing 1.

At the end 4 of the housing 1, the piston rod 3 is sealingly guided in a guide. The guide itself consists of two components, namely of a stop and spacer sleeve 8 with a guide section 9 for the piston 3 and of a guide ring 10. The sleeve 8 faces the piston 6, the guide section 9 being turned towards the piston 6, too. The guide ring 10 faces the end 4 of the housing 1. A seal 11 is disposed between the sleeve 8 and the ring 10, an exterior sealing ring 12 of the seal 11 bearing sealingly against the inside wall 7 of the housing 1. It further comprises an interior sealing ring 13, which is formed in one piece with the exterior sealing ring 12, and which bears sealingly against the piston rod 3.

The sleeve 8 has an exterior circumferential groove 14, with which engages a crimp 15 formed in the housing 1 and projecting towards the axis 2, the stop and spacer sleeve 8 thus being tightly joined to the housing 1 and defined in its position relative to the housing 1 in the direction of the axis 2. One end 4 of the housing is provided with a bead 16 enclosing the guide ring 10, the latter thus being arrested in the housing 1. Providing a crimp 15 on the one hand and a bead 16 on the other, will predetermine the distance of the guide ring 10 from the sleeve 8 and thus the prestress of the seal 11 in the direction of the axis 2 between the ring 10 and the sleeve 8. As a result of this prestress in the direction of the axis 2, there is some bracing in the radial direction, i.e. this prestress in the direction of the axis 2 will also predetermine the pressure by which the exterior sealing ring 11 applies on the inside wall 7 and the interior sealing ring 13 on the piston rod 3.

The inside wall 7 of the housing 1 is provided with a passage way 17 formed by a longitudinal crimp, through which compressed gas can flow past the piston 6, out of the housing chamber 18 defined by the piston 6 and the closed end 5, into the housing chamber 19 defined by the piston 6 and the guide, and vice versa. The housing 1 is partially or completely filled with compressed gas and some oil as a lubricant.

The housing 1 comprises a ring 20 welded on its end 5 and having a threaded pin 21, both being disposed concentrically of the axis 2. A ball socket 22 of an angle joint is screwed on the threaded pin 21, the ball socket 22 having a cylindrical opening 23 with a corresponding internal thread 24. Of course, such a ball socket 22 can also be screwed on the thread 25 disposed on the end of the piston rod 3.

Conventionally, the ball socket 22 comprises a recess 26 for the accommodation of a ball pivot (not shown).

Constructional details of the piston 6 will become apparent from FIGS. 2 to 4 of the ensuing description.

The piston 6 comprises a basic body 27, which has a centric recess 28 into which to slip a pin-type section 29 of the piston rod 3. The basic body 27 bears against a collar 30, which is formed where the pin-type section 29 passes into the piston rod 3.

A piston ring 32 is inserted into an annular recess 31 in the basic body, the recess 31 being open towards the free end of the pin-type section 29. Then a ring disk 33 is slipped on the section 29 as far as to bear against the basic body 27. Subsequently, the free end of the pin-type section 29 is riveted, which serves to form a head 34 on the section 29, the head 34 holding the piston 6.

The ring section 35 of greater diameter of the basic body 27 has ducts 36, which are parallel to the axis 2 and open into the annular recess 31 where the piston ring is located. When the gas spring is mounted, the piston ring 32 rests tightly on the inside wall 7 of the housing 1 so that no gas can flow between its outside and the inside wall 7 of the housing 1 during motions of the piston rod 3 with the piston 6. The piston ring 32 continues to lodge in the annular recess 31 with axial play relative to the ring disk 33 or the ring section 35 of the basic body 27 so that, upon extraction of the piston rod 3 from the housing 1, the piston ring 32 bears against the ring disk 33, the narrow gap 37 between the ring disk 33 and the inside wall 7 of the housing 1 thus being closed. In this case, no gas can flow from the housing chamber 19 through the piston 6 and into the housing chamber 18.

If, however, the piston rod 3 and the piston 6 are pushed into the housing 1, the piston ring 32 bears against the ring section 35 of the basic body 27 so that gas can flow from the housing chamber 18 through the gap 37, the annular recess 31 and the ducts 36 into the housing chamber 19. As far as described above, the gas spring comprising the piston 6 is generally known.

As seen from FIGS. 2 to 4, between the ducts 36, the ring section 35 of have a basic body 27 exhibits outer partial cylinder faces 38, which are concentric of the axis 2 and the radius r of which is slightly smaller than the radius R of the inside wall 7 of the housing I so that these partial cylinder faces 38 do not rest on the inside wall 7 of the housing 1 but form a very narrow gap 39 towards the latter, as seen in FIG. 4.

The ducts 36 are partially defined by flexible tongues 40 formed in one piece with the ring section 35. As seen in FIG. 2, these flexible tongues 40 have a rounded end 41, the radius $r_{4l}$ of which slightly exceeds the radius R of the inside wall 7 of the housing 1 in a condition when the piston 6 is not mounted. As seen in FIG. 3, parallel to the axis 2, the rounded end 41 of the flexible tongues 40 has a slightly crowned boundary line 42, which, in the mounted condition of the piston 6, rests on the inside wall 7 of the housing 1 approximately by point contact. In the vicinity of the crowned boundary lines 42, the rounded ends 41 of the flexible tongues 40 may have small grease chambers 43. The flexible tongues 40 will in particular prevent the partial cylinder faces 38 of the piston 6 from smashing against the inside wall 7 of the housing 1 during vibrations of the gas spring. When the piston 6 is retracted into the housing 1, the flexible tongues 40 are elastically deformed in a direction towards the ducts 36 and rest on the inside wall 7 of the housing 1. By contrast, the partial cylinder faces 38 do not rest on the inside wall 7 of the housing 1. For these deformations to be possible, the basic body 27 of the piston 6 consists of an appropriate hard elastic plastic material, for instance a polyamide. The flexible tongues 40 rest on to inside wall 7 of the housing 1 by slight prestress. Owing the the crowned design of the boundary lines 42, the piston 6 can also perform tilting motions about the axis 2 without jamming of the flexible tongues 40 occurring relative to the inside wall 7 of the housing 1. Even in the case of such jamming, the partial cylinder faces 38 of the piston 6 do not contact the inside wall 7.

What is claimed is:

1. A fluid-filled gas spring having a cylinder and a piston rod, comprising
   a substantially cylindrical housing (1), which has a central longitudinal axis (2), a closed first end (5), and a second end (4), and an inside wall (7),
   a piston rod (3), which is disposed partially inside the housing (1) and partially outside the housing (1) coaxially to the central longitudinal axis (2),
   a guide disposed on the second end (4) of the housing (1) for the guidance and sealing of the piston rod (3) in the direction of the central longitudinal axis (2), and
   a piston (6), which is mounted on the piston rod (3) and allocated to the inside wall (7),
   wherein the piston (6) has partial cylinder faces (38), which are distributed over its circumference and leave open a gap (39) towards the inside wall (7) of the housing (1), and flexible tongues (40), which flexibly rest on the inside wall (7) of the housing (1) said flexible tongues (4) preventing the partial cylinder faces (38) from smashing against the inside wall (7), when the gas spring is vibrating.

2. A fluid-filled gas spring having a cylinder and a piston rod, comprising
   a substantially cylindrical housing (1), which has a central longitudinal axis (2), a closed first end (5), and a second end (4), and an inside wall (7),
   a piston rod (3), which is disposed partially inside the housing (1) and partially outside the housing (1) coaxially to the central longitudinal axis (2),
   a guide disposed on the second end (4) of the housing (1) for the guidance and sealing of the piston rod (3) in the direction of the central longitudinal axis (2), and
   a piston (6), which is mounted on the piston rod (3) and allocated to the inside wall (7),
   wherein the Piston (6) has partial cylinder faces (38), which are distributed over its circumference and leave open a gap (39) towards the inside wall (7) of the housing (1), and flexible tongues (40), which flexibly rest on the inside wall (7) of the housing (1), said flexible tongues (4) preventing the partial cylinder faces (38) from smashing against the inside wall (7), when the gas spring is vibrating wherein, towards the inside wall (7) of the housing (1), the flexible tongues (40) partially define ducts (36) formed in the piston (6), the flexible tongues (40) being elastically deformable radially to the axis (2) in a direction toward the ducts (36) and resting due to a slight prestress on the inside wall (7), the ducts (36) being partially open towards the inside wall (7).

3. The gas spring according to claim 2, wherein the flexible tongues (40) have ends (41) rounded in cross-section, which rest on the inside wall (7) of the housing (1).

4. The gas spring according to claim 2, wherein a crowned boundary line (42) of the flexible tongues (40) rests on the inside wall (7) of the housing (1).

5. The gas spring according to claim 2, wherein the partial faces are partial cylinder faces (38).

6. The gas spring according to claim 2, wherein the flexible tongues (40) are formed in one piece with a piston (6) basic body (27) which exhibits the partial faces (38).

7. The gas spring according to claim 2, wherein the basic body (27) of the piston (6) and the flexible tongues (40) consist of plastic material.

* * * * *